Figure 1:
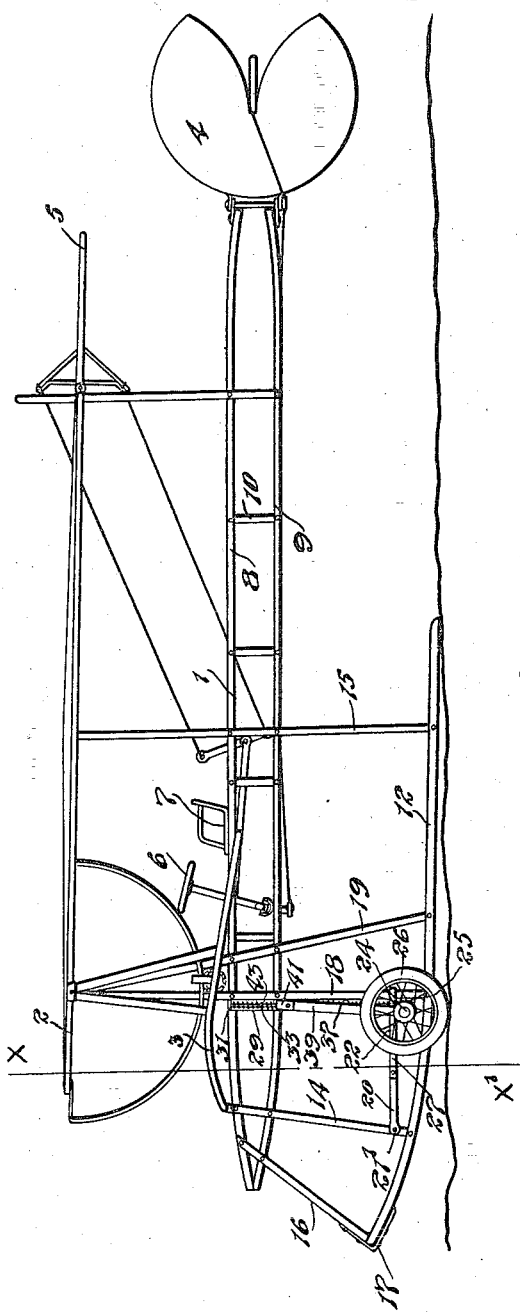

J. M. MOORHOUSE.
RUNNING GEAR FOR AEROPLANES.
APPLICATION FILED MAY 14, 1914.

1,127,798.

Patented Feb. 9, 1915.
2 SHEETS—SHEET 1.

WITNESSES:

INVENTOR

By

ATTORNEY

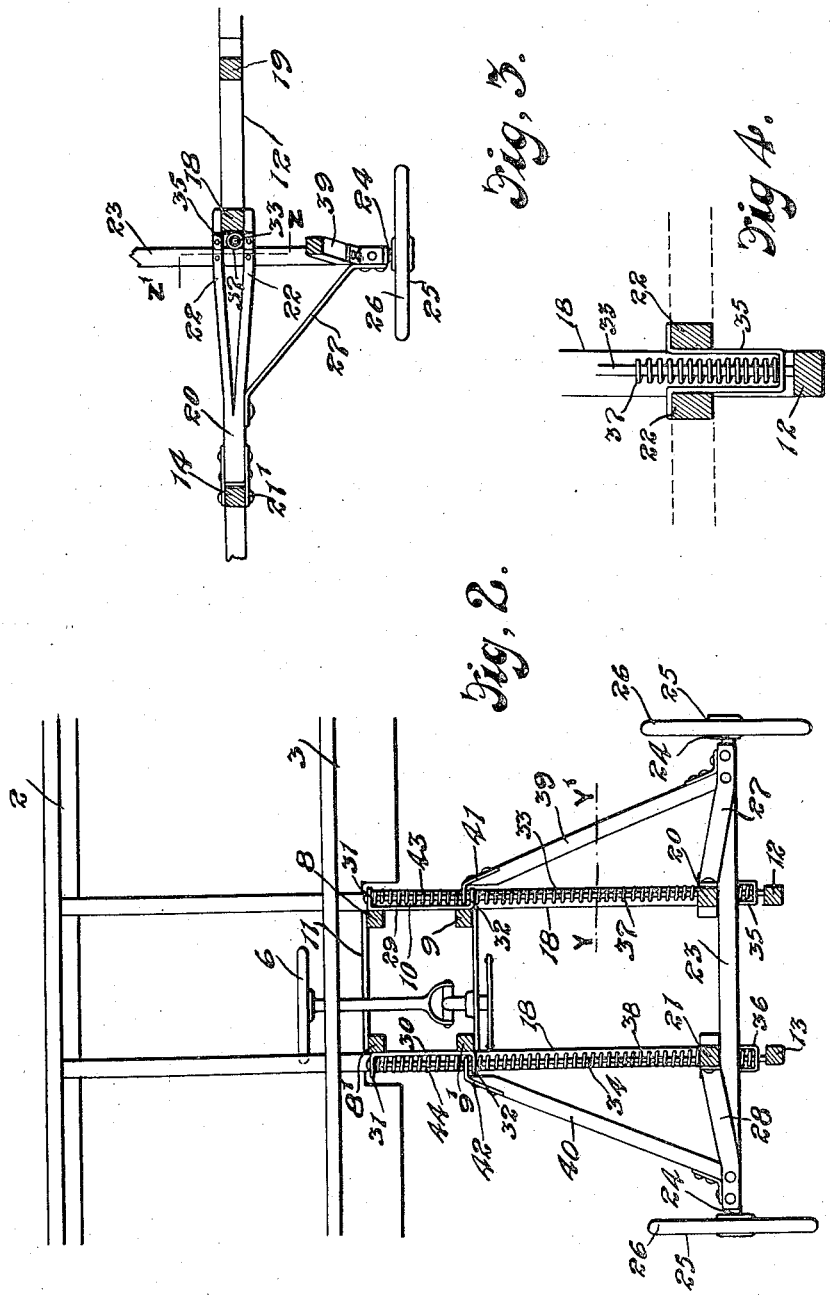

UNITED STATES PATENT OFFICE.

JOHN MILFORD MOORHOUSE, OF WINNIPEG, MANITOBA, CANADA.

RUNNING-GEAR FOR AEROPLANES.

1,127,798.  Specification of Letters Patent.  Patented Feb. 9, 1915.

Application filed May 14, 1914. Serial No. 838,519.

*To all whom it may concern:*

Be it known that I, JOHN MILFORD MOORHOUSE, of the city of Winnipeg, in the Province of Manitoba, Canada, have invented certain new and useful Improvements in Running-Gears for Aeroplanes, of which the following is the specification.

The invention relates to an improvement in running gears for aeroplanes and the object of the invention is to provide a durable and efficient running gear which will carry and allow a machine to run freely and lightly on the ground and one which will withstand and absorb the shock incident to a machine landing or alighting on the ground.

With the above object in view the invention consists essentially in the arrangement and construction of parts hereinafter more particularly described and later pointed out in the appended claims.

Figure 1 represents a side view of a machine supplied with my running gear. Fig. 2 represents an enlarged detailed vertical sectional view through the device, the section being taken in the plane denoted by the line X—X' Fig. 1. Fig. 3 is an enlarged detailed horizontal sectional view through the running gear, the section being taken in the plane denoted by the line Y—Y' Fig. 2. Fig. 4 is a vertical sectional view through a portion of the running gear, the section being taken in the plane denoted by the line Z—Z' Fig. 3.

In the drawings like characters of reference indicate corresponding parts in each figure.

1 represents the fuselage or body of an aeroplane carrying forwardly top and bottom planes 2 and 3 and supplied rearwardly with vertical and horizontal rudders 4 and 5, respectively, controlled by a steering wheel 6 which wheel adjoins the aviator's seat 7 mounted on the body of the machine.

I am not entering into a detailed description of the general construction of the aeroplane other than the fuselage and running gear as this forms no part of my present invention.

The fusilage is formed from four principal struts, 8, 9, 8' and 9' suitably connected one to the other by cross stays 10 and 11 so as to present a rigid structure.

12 and 13 are a pair of parallel skids located considerably beneath the fuselage and connected permanently to the same by upright forward and rear pairs of legs 14 and 15, the legs being fastened to the fuselage and skids in any suitable way. The forward end of the skids are curved slightly upwardly and are reinforced by braces 16 passing to the fuselage, shoes 17 being applied on the braces and skids at their forward sides.

18 and 19 are pairs of standards permanently secured to the skids and to the sides of the fuselage more or less centrally between the legs 14 and 15.

20 and 21 are pairs of arms having their forward ends pivotally secured by cross pins 21' to the pair of legs 14 and 15 and their rear ends forked at 22 and spanning the pairs of standards 18.

23 is a cross beam permanently secured rearwardly to the arms 20 and 21 in advance of the standards 18. The beam is supplied at the ends with axles 24 on which I have mounted wheels 25 provided with pneumatic tires 26.

27 and 28 are angularly disposed braces passing between the axle and the arms 20 and 21 respectively.

29 and 30 are a pair of brackets permanently secured to the struts 8, 9, 8' and 9' and having offset ends 31 and 32.

33 and 34 are vertically disposed rods having their upper ends permanently fastened or anchored in the offset ends 31 and 32 of the brackets and their lower ends permanently secured to the skids 12 and 13.

35 and 36 are U-shaped hangers permanently fastened to the forked ends of the arms and receiving the rods slidably.

37 and 38 are coiled springs inserted on the rods between the hangers and the offset ends 32 of the brackets.

39 and 40 are angularly disposed brace bars having their lower ends permanently secured to the offset ends of the beam 23 and their upper ends connected to the rods 33 and 34 by plates 41 and 42 the plates receiving the rods loosely. Coiled springs 43 and 44 are inserted on the rods between the offset ends 31 of the brackets and the plates 41 and 42 respectively.

The parts are arranged so that the machine rests normally on the rear ends of the skids and on the wheels the greater portion of the skids being clear of the ground.

In landing or alighting the shock is taken up by the springs, the axle with the arms swinging upwardly and accordingly compressing the springs.

The standards 18 act as guides for the arms to prevent them from being displaced laterally.

What I claim as my invention is:—

1. In a running gear for aeroplanes the combination with a pair of skids, a forward and rear pair of legs permanently secured to the skids and a fuselage carried by the legs, of a pair of rearwardly extending forked arms having their forward ends pivotally connected to the front pair of legs, a cross beam permanently secured to the forked ends of the bars and provided at its extremities with suitable carriage wheels, brackets permanently secured to the fuselage, vertically disposed rods extending between the brackets and the skids and passing between the forked ends of the arms, coil springs mounted on the rods and interposed between the brackets and the arms and coil springs mounted on the rods and interposed between the cross beam and the brackets, as and for the purpose specified.

2. In a running gear for aeroplanes the combination with a pair of skids, a forward and rear pair of legs permanently secured to the skids and a fuselage carried by the legs, of a pair of rearwardly extending forked arms having their forward ends pivotally connected to the front pair of legs, a cross beam permanently secured to the forked ends of the bars and provided at its extremities with suitable carriage wheels, vertically disposed brackets secured to the opposite sides of the fuselage and provided with offset upper and lower ends, vertically disposed rods connected to the brackets and to the skids, said rods passing between the forked ends of the arms, hangers secured to the arms and receiving the rods slidably, coil springs mounted on the rods and interposed between the hangers and the lower offset ends of the brackets, angularly disposed brace beams having their outer ends secured to the outer ends of the cross beam, extending plates permanently fastened to the inner ends of the brace bars and having their extending ends located above the lower ends of the brackets and receiving the rods slidably and coil springs mounted on the upper ends of the rods and disposed between the upper ends of the brackets and the plates, as and for the purpose specified.

3. In a running gear for aeroplanes the combination with a pair of skids, a forward and rear pair of legs permanently secured to the skids and a fuselage carried by the legs, of a vertically disposed pair of standards extending between the fuselage and the skids, a pair of forked arms having their forward ends pivotally secured to the front pair of legs and their rear ends spanning the standards, a cross beam permanently secured to the rear ends of the arms in advance of the standards, said cross beam being supplied at its extremities with suitable carriage wheels, a pair of brackets secured to the opposite sides of the fuselage and having the upper and lower ends thereof outturned, vertically disposed rods extending between the brackets and the skids, said rods passing between the forked ends of the arms, hangers secured to the forked ends of the arms and receiving the lower ends of the rods slidably, coil spring mounted on the lower ends of the rods and interposed between the hangers and the lower outstanding ends of the brackets, angularly disposed brace bars having their outer ends permanently fastened to the extremities of the cross beam, extending plates secured to the inner ends of the brace bars and having their extending ends located above the lower ends of the brackets and receiving the upper ends of the rods slidably and coil springs mounted on the upper ends of the rods and interposed between the upper ends of the brackets and the plates, as and for the purpose specified.

Signed at Winnipeg this 6th day of August, 1913.

JOHN MILFORD MOORHOUSE.

In the presence of—
   G. S. ROXBURGH,
   S. SILVERT.